United States Patent [19]

Hauser

[11] 3,747,437

[45] July 24, 1973

[54] ENGINE AND TRANSMISSION WITH SAFETY SYSTEM

[75] Inventor: Hans Hauser, Fredericktown, Ohio

[73] Assignee: The J. B. Foote Foundry Co., Fredericktown, Ohio

[22] Filed: Apr. 22, 1971

[21] Appl. No.: 136,510

[52] U.S. Cl. .............................. 74/850, 123/179 K
[51] Int. Cl. ........................................ B60k 27/00
[58] Field of Search ................... 74/850; 123/179 K

[56] References Cited
UNITED STATES PATENTS

| | | | |
|---|---|---|---|
| 3,587,351 | 6/1971 | Keller | 74/850 |
| 2,511,054 | 6/1950 | Ferguson et al. | 123/179 K |
| 3,285,361 | 11/1966 | Baker | 123/179 K |
| 3,521,612 | 7/1970 | Santi et al. | 74/850 |
| 3,613,482 | 10/1971 | Benson, Jr. et al. | 74/850 |

*Primary Examiner*—C. J. Husar
*Attorney*—Allen D. Gutchess, Jr.

[57] ABSTRACT

This invention relates to an engine and a transmission with a safety system to prevent operation of the engine if the transmission is in gear. The system is designed so that a switch operated by shift means of the transmission is closed when the transmission is in neutral and open when it is in gear. The engine is prevented from starting whenever the switch is in the open position. The switch is preferably mounted in the transmission housing so as to be precisely located with respect to the shift mechanism and thereby assure that the position of the switch is reliably coordinated with the shift mechanism and the position of the transmission. By mounting the switch within the transmission housing, it is also protected from dirt and physical damage and does not interfere with the operator.

6 Claims, 17 Drawing Figures

INVENTOR.
HANS HAUSER
BY
Allen D. Gutchess, Jr.
ATTORNEY

INVENTOR.
HANS HAUSER
BY
Allen D. Gutchess Jr.
ATTORNEY

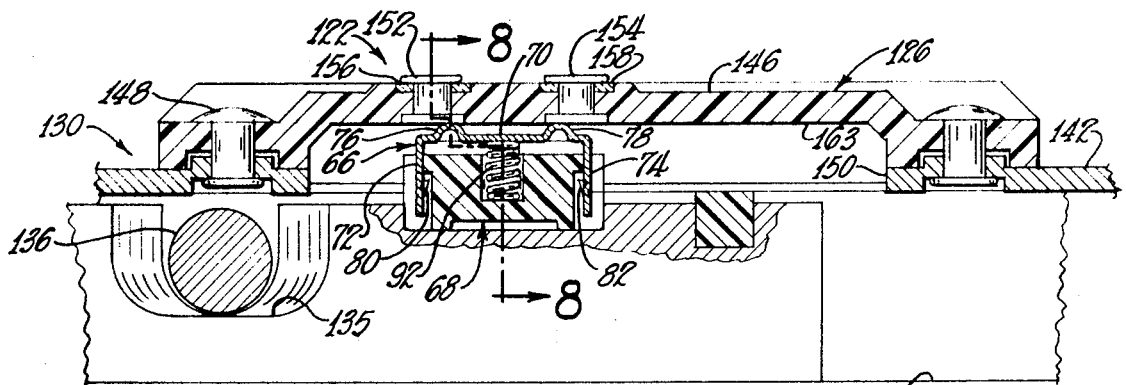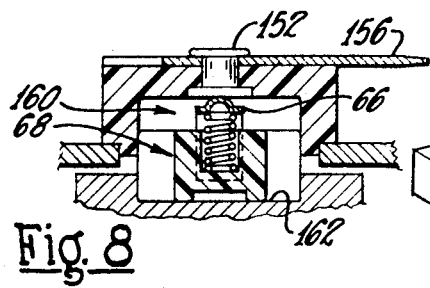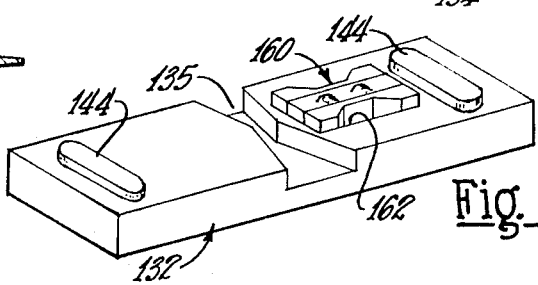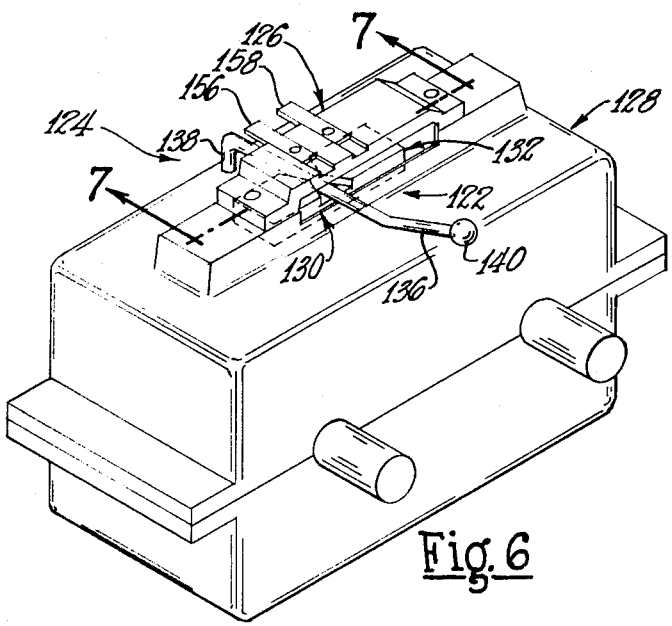

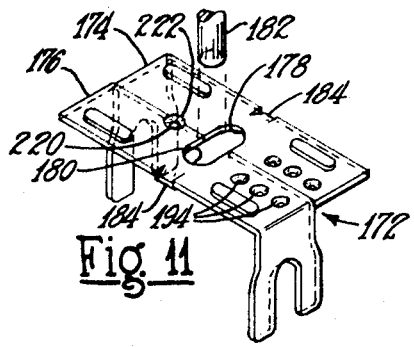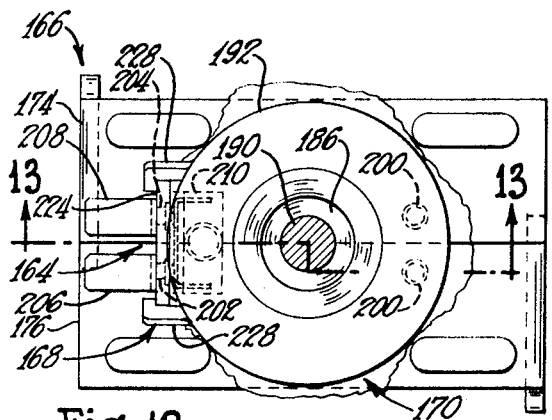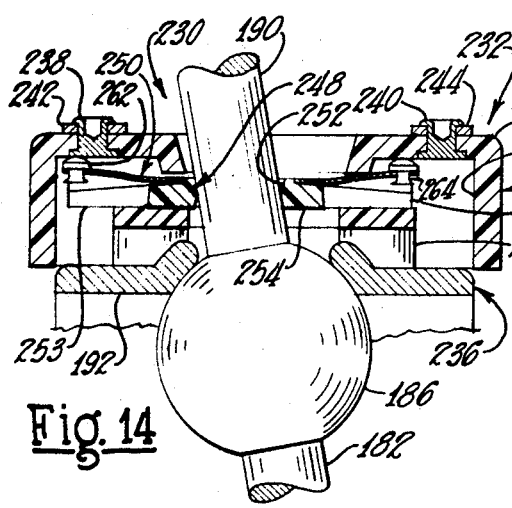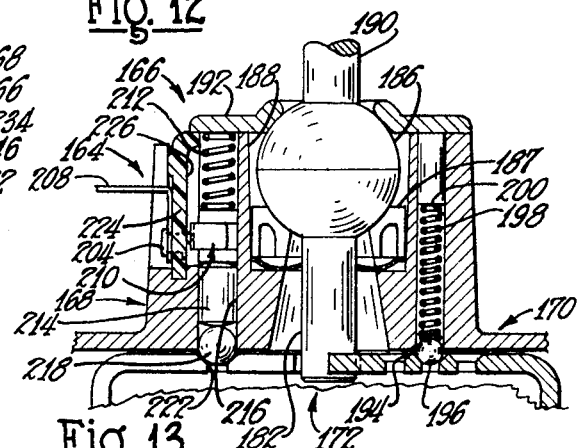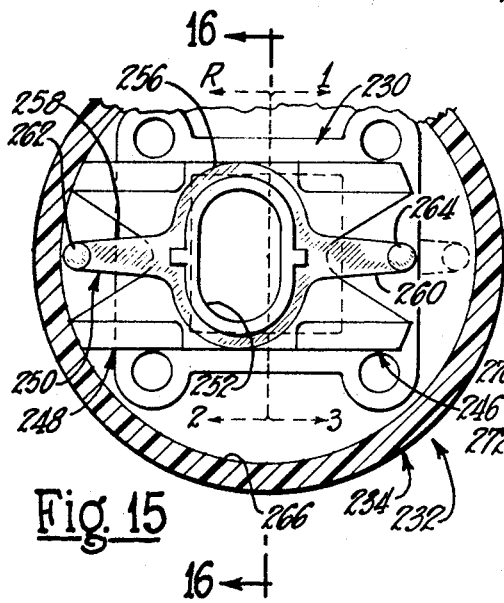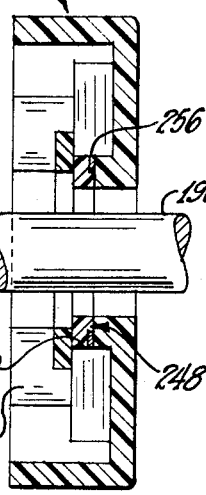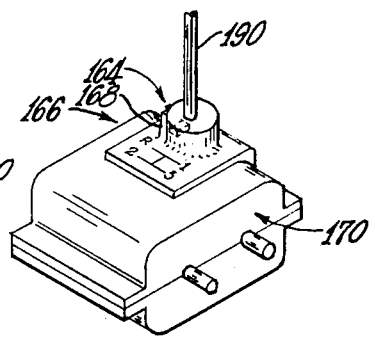

3,747,437

ENGINE AND TRANSMISSION WITH SAFETY SYSTEM

This invention relates to an engine and a transmission with safety means to prevent operation of the engine when the transmission is in gear.

Engines and transmissions to which the invention relates are of the type commonly used for operating such machines or vehicles as lawnmowers, garden tractors, snow blowers, tillers, gold carts, snowmobiles, all-terrain vehicles, and the like. Engines of such machines commonly have been able to be started even when the transmissions or other drive trains are in gear. This obviously can, and has, caused personal injury to the operators or others through the resulting movement of the machines or blades, etc. thereof when started in gear.

Heretofore, safety arrangements have been proposed to a limited extent for preventing starting of engines when the transmissions are in gear. Such an arrangement is disclosed in U.S. Pat. No. 3,521,612, including a switch which is open when the transmission is in neutral to enable the engine to be started. When the switch is closed, with the transmission shift in gear, the switch grounds the primary of the magneto and prevents the engine from starting because the spark plug will not fire. However, if the switch contacts are dirty or if any conductor in series with the switch is broken, the engine will start whether the transmission is in gear or not. This safety arrangement then is more dangerous than if none were used at all since the operator places reliance thereon, reducing the caution he would otherwise use.

The safety system according to the invention employs a switch which is closed when in neutral and enables the engine to start when the switch is closed. Consequently, if the switch contacts should become dirty, corroded, etc., or if a conductor in series therewith is broken, the engine will not start, since the system will be in the same condition as if the switch were open and the transmission were in gear.

The switch according to the invention is built into the transmission housing and preferably is precisely located with respect to the shift mechanism to assure that the switch will be closed with the transmission in neutral, and otherwise opened. This assures reliability of the operation of the switch, which cannot be attained if, for example, a limit switch is simply mounted on top of the transmission housing and engaged by the shift lever. By being within the transmission housing, the switch is also protected from physical damage, dirt, snow, rain, etc., and does not interfere with the operator. The switch includes a switch contact assembly within the housing and at least one terminal extending out of the housing and connected into a circuit by the switch assembly when the shift lever and mechanism is in a predetermined position, preferably neutral. The switch assembly in the housing has a conductor mounted on an insulating body or member which is movable in a given path by the shift means during shifting.

Besides having utmost reliability, the switch is capable of being used in any weather, requires substantially no maintenance, is durable, and is also low in cost.

It is, therefore, a principal object of the invention to provide a safety system for an engine and transmission to prevent operation of the engine when the transmission is in gear.

Another object of the invention is to provide an engine and transmission with a safety system which prevents starting of the engine when a switch operated by the transmission shift mechanism is opened and the transmission is in gear.

Yet another object of the invention is to provide a safety system for an engine and transmission, which system has the utmost reliability.

A further object of the invention is to provide a safety system for an engine and transmission which is low in cost, durable, and substantially maintenance free.

Still a further object of the invention is to provide a safety system for an engine and transmission having a switch mounted within the transmission in a precise position relative to the shift mechanism thereof.

Other objects and advantages of the invention will be apparent from the following detailed description of preferred embodiments thereof, reference being made to the accompanying drawings, in which;

FIG. 6 is a somewhat schematic view in perspective of a two-speed transmission embodying a safety switch in the transmission housing, according to the invention;

FIG. 7 is an enlarged, fragmentary view in cross section, taken along the line 7—7 of FIG. 6;

FIG. 8 is a view in transverse cross section taken along the line 8—8 of FIG. 7;

FIG. 9 is a view in perspective of a switch assembly and part of the shift mechanism of the transmission of FIGS. 6-8;

FIG. 10 is a somewhat schematic view in perspective of a three-speed transmission embodying a safety switch according to the invention;

FIG. 11 is a view in perspective of two shifter forks of the shift mechanism in the transmission of FIG. 10;

FIG. 12 is a somewhat schematic, fragmentary top view with parts broken away, of the three-speed transmission embodying the safety switch in the transmission housing;

FIG. 13 is a view in cross section taken along the line 13—13 of FIG. 12;

FIG. 14 is a further enlarged view of part of a three-speed transmission employing a modified safety switch in the transmission housing, according to the invention;

FIG. 15 is a top view of the transmission of FIG. 14 with a cover removed;

FIG. 16 is a view in transverse cross section taken along the line 16—16 of FIG. 15.

Figure 1:
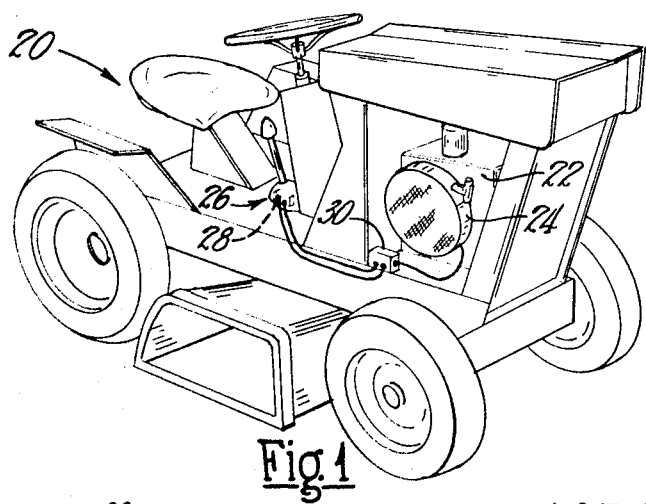
FIG. 1 is a somewhat schematic view in perspective of a riding lawn mower having an engine, a transmission, and a safety system according to the invention.

Referring particularly to FIG. 1, a riding lawn mower 20 is representative of a typical machine or vehicle within which the invention can be used. The machine 20 includes an internal combustion engine 22 having a magneto in a portion 24. The machine also has a transmission 26 which is connected with the engine 22 and drives the rear wheels of the machine when in gear. A switch shown schematically at 28 is preferably embodied in the transmission 26 and is closed when the transmission is in neutral and open when the transmission is in gear. The switch 28 is electrically connected with a circuit mounted in a suitable housing or box shown schematically at 30 and is effective to prevent starting of the engine 22 when the switch 28 is open and to enable starting of the engine when the switch is closed. Thus, when the transmission 26 is in neutral, the switch 28 is closed and the engine 22 can be started. When the transmission is in gear, the switch 28 is open and the engine is prevented from starting. If the switch contacts should be dirty to prevent making electrical contact when in the closed position, the engine will still be prevented from starting, which will also be the case if the electrical wires connected with the switch 28 are broken. Hence, the system is fail-safe.

As shown, th circuit housing 30 is electrically connected with the magneto portion 24 of the engine 22 and can short out the magneto when the switch 28 is open to prevent the engine from starting. If the engine is electrically started, the switch 28 can also be connected into the electrical starting system again to prevent starting of the engine when the switch 28 is oepn. It is preferred, however, to connect the safety system with the magneto of the engine since most small engines for vehicles with hich the invention is concerned are equipped with magnetos, whereas many are not equipped with electrical starting systems.

Figure 2:
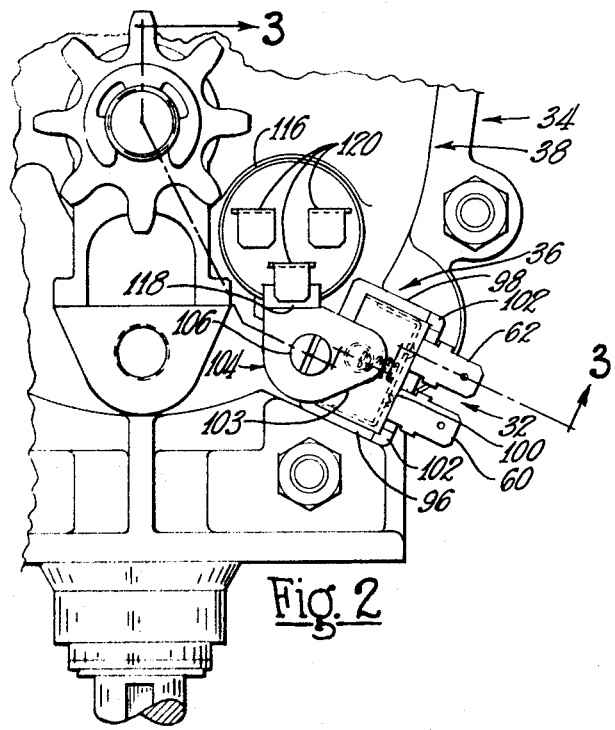
FIG. 2 is a fragmentary top view of a single-speed transmission embodying a safety switch in the transmission housing, according to the invention.
Figure 3:
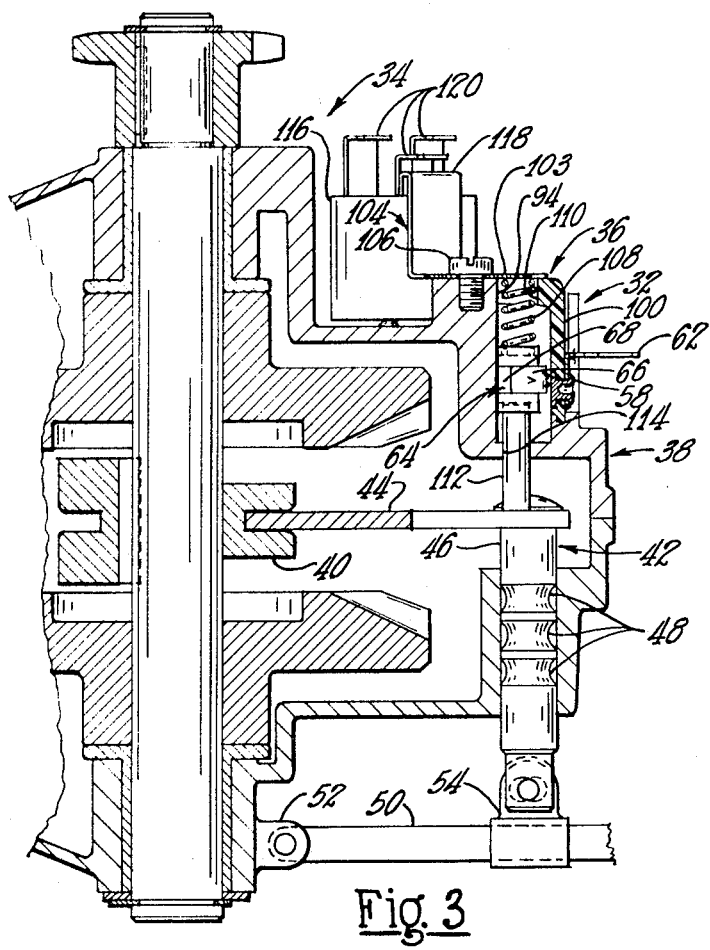
FIG. 3 is a fragmentary view in transverse cross section taken along line 3—3 of FIG. 2.
Figure 4:
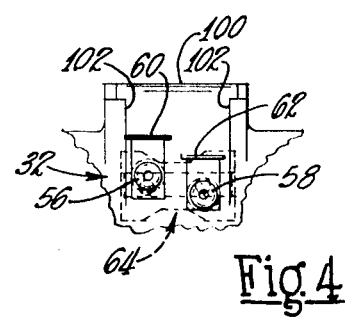
FIG. 4 is a fragmentary front view of the switch of FIGS. 2 and 3.

Referring particularly to FIGS. 2–4, a specific safety switch according to the invention is indicated at 32 and is shown with a single-speed transmission 34, specifically being incorporated in a projecting portion 36 of a transmission housing 38. The single-speed transmission 34 has a single forward speed, a neutral, and a reverse. This transmission is a commercially available product, except for the provisions for the switch 32, and will not be discussed in detail. Shifting is accomplished by a shift dog 40 moved by means of shift mechanism 42 including a shifter fork 44 and a shift rod 46. The latter is moved lineally among any of three positions determined by notches 48 engaged by a detent (not shown) located in back of the rod 46, as viewed in FIG. 3. The transmission 32 is in neutral when the detent engages the center one of the three notches 49 and is in either forward or reverse when the detent engages either of the outer two notches. The shift mechanism 42 and specifically the rod 46 is moved between the three positions by a suitable shift lever 50, shown schematically, which is pivotally mounted by ears 52 on the housing 38 and engaged with the end of the rod 46 by a clevis 54. The shift mechanism 42 and the shift lever 50 constitute shift means for the transmission 34.

In the neutral position of the transmission 34 and the shift mechanism 42, it is desired that the switch 32 be closed. The switch 32 includes two stationary electrical contacts 56 and 58 having inner surfaces exposed within the transmission housing 38 and specifically within the housing portion 36, and having outer surfaces exposed outside the housing. Terminals 60 and 62 are electrically connected to the contacts 56 and 58 and can receive terminal clips for making connections with a safety circuit.

Figure 5:
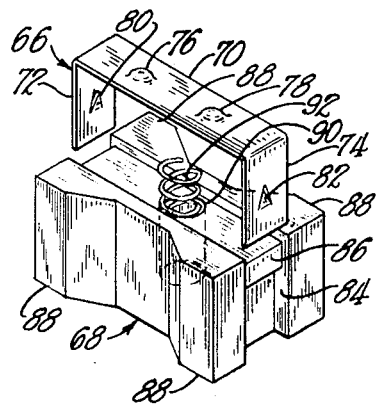
FIG. 5 is a view in perspective of a movable switch contact assembly constituting part of the safety switch.
Figure 17:
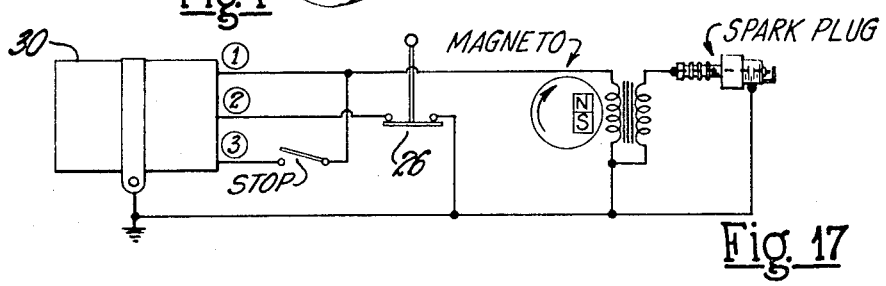
FIG. 17 is a diagrammatic view of a safety system according to the invention embodied with an ignition system.
Figure 18:
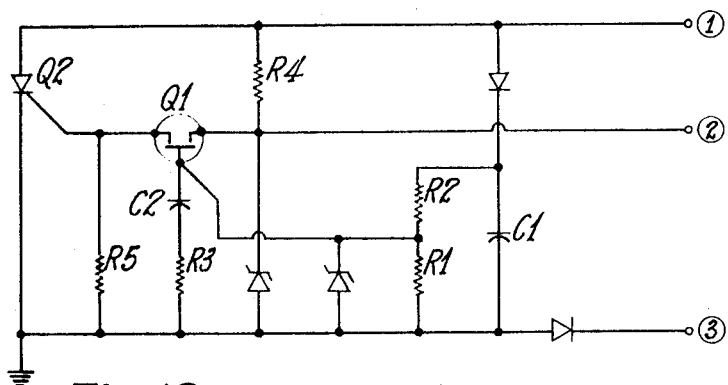

The safety switch 32 further includes a movable switch contact assembly or means 64 located within the housing 34 and specifically in the portion 36. The assembly 64 includes a conducting member or strip 66 carried by an insulating member or block 68. These are shown in more detail in FIG. 5, the strip 66 including an upper elongate conducting plate 70 having flanges or legs 72 and 74 bent downwardly from ends thereof. The conducting plate 70 has two contacts 76 and 78 projecting upwardly therefrom to engage the stationary contacts 56 and 58 when properly positioned with respect thereto. The legs 72 and 74 have ears 80 and 82 struck inwardly therefrom with the legs received in channels 84 formed in the ends of the insulating block 68. The channels 84 are effective to fully protect the conducting legs 72 and 73 and prevent possible electrical contact with metal portions of the transmission housing. The block 68 also has extensions 86 at the upper ends of the channels 84 which cooperate with the ears 80 and 82 to prevent separation of the conducting strip 66 and the block 68. The block 68 has flared portions 88 extending outwardly on each side of the channels 84 to provide greater stability for the block 68, particularly when it is to be operated with transverse movement. Further, a central recess 90 is located in the block in which is received a coil spring 92 which urges the conducting strip 66 outwardly so that the movable contacts 76 and 78 can firmly engage the stationary contacts 56 and 58.

Referring again to FIGS. 2–4, the switch assembly 64 is located in a chamber 94 of the projecting portion 36 formed by side walls 96 and 98 and by an L-shaped insulating wall 100. The wall 100 is in engagement with front flanges 102 of the side walls 96 and 98 and also held in place by a flange 103 of a bracket 104 affixed to the housing 34 by a suitable fastener 106. The stationary contacts 56 and 58 are mounted in the insulating wall 100, with the terminals 60 and 62 slightly staggered, as shown in FIG. 4, to prevent interference of the clips (not shown) inserted thereon. The contacts 56 and 58 thus are not electrically connected unless the contact assembly 64 is positioned so that the contacts 56 and 58 are engaged by the contacts 76 and 78. In this instance, the conductors connected to the terminals 60 and 62 are electrically connected through the plate 70.

The contact assembly 64 is urged downwardly in the chamber 94 by a spring 108, the upper end of which is received in a notch 110 of the insulating wall 100. The contact assembly 64 is moved upwardly against the spring 108, guided by the side walls 96 and 98, by a pin or other suitable elongate member 112, constituting part of the switch 32, which extends through a bore 114 and into contact with the shift mechanism 42 and specifically the fork 44. When the transmission is in neutral, the shift mechanism 42 is in the position shown in FIGS. 3 and 4 and the switch ssembly 64 is positioned so that the conducting member 66 connects the stationary contacts 56 and 58. When the shift mechanism 42 is moved upwardly, as viewed in FIG. 3, to place the transmission in gear, the pin 112 forces the switch assembly 64 upwardly in a lineal path against the force of the spring 108 to move the conducting member 66 above the contacts 56 and 58, eliminating electrical contact between them. Similarly, when the shift mechanism 42 is moved downwardly, as viewed in FIG. 3, to place the transmission in the other gear (forward or reverse), the spring 108 forces the assembly 64 downwardly to move the conducting member 66 below the stationary contacts 56 and 58. Hence, the contacts 56 and 58 are only electrically connected, and the switch 32 is closed, when the transmission is in neutral with the detent in the central notch 48.

When a compact solid state safety circuit is employed in the safety system, it can be incorporated into a can or container 116 mounted directly on the housing 38 by a leg 118 of the bracket 104. The container 116 is schematically represented in FIG. 1 by the container 30. The container 116 has suitable terminals 120 extending upwardly therefrom to which conductors and clips are connected to connect the circuit in the container 116 with the safety switch 32 and with the engine, as required by the specific circuit employed. The bracket 104 can also serve as a ground for the container 116 if required and desired.

It will be seen from the above that the switch 32 is precisely mounted with respect to the shift mechanism 42 to assure that the movable contact assembly 64 will be located in the desired position with respect to the stationary contacts 56 and 58 when the shift mechanism 42 is in any specific position. Further, the components of the switch 32 are protected against damage, dirt, weather, etc. and are out of the way of the operator. The switch 32 is also compact, low in cost, and requires minimum maintenance.

In FIGS. 6–9, a safety switch 122 is embodied in a commercially available two-speed transmission 124, being located in a projecting housing portion 126 of an overall transmission housing 128. Shift mechanism 130 is effective to place the transmission in either of two speeds forward, neutral, or reverse. The shift mechanism includes a slide block 132 lineally movable in a groove or channel 134 in the housing. The slide block has grooves (not shown) in the bottom thereof which receives pins of shifter forks which are moved transversely of the slide block as the slide block is lineally moved in the channel 134. This transmission and basic shift mechanism is disclosed more fully in my U.S. Pat. No. 3,426,611 and will not be discussed in detail. The slide block 132 has a transverse notch 135 in which is received an intermediate portion of a shift lever 136 having an end 138 pivoted in a recess in the housing 128. The opposite end of the shift lever extends upwardly and terminates in a handle 140. The shift mechanism 130 and the shift lever 136 constitute shift means for the transmission 124.

When th lever 136 is pivoted back and forth, it moves the slide block 132 lineally which, in turn, moves the shifter forks to predetermined positions. The bottom of the slide block 132 also can have recesses therein which receive a spring-loaded ball or detent to hold the slide block and the shift lever in any of the four positions--two speeds forward, neutral, and reverse.

The housing portion 126 has a metal cover 142 located above the slide block 132 and the channel 134, with the slide block having two plastic bearing pads 144 in contact with the cover. An insulatng wall 146 is affixed to the cover 142 by suitable rivets 148 above an opening 150 therein.

The switch 122 includes two stationary contacts 152 and 154 mounted in the wall 146 having inner surfaces exposed within the housing portion 126 and outer surfaces exposed outside the housing. Terminals 156 and 158 are connected to the stationary contacts 152 and 154 and extend outwardly therefrom to receive clips and conductors of a safety circuit. The switch 122 also includes a movable switch contact assembly 160 carried in a recess 162 of the slide block 132 which is part of the shift mechanism 130. The assembly 160 extends into a chamber 163 formed by the insulating wall 146. The contact assembly 160, as shown, includes the conducting member 66 and the insulating block or member 68 used with the contact assembly 64 of FIG. 3, with perhaps a variance in dimensions.

When the shift lever 136 is in the neutral position, as shown in FIG. 6, the contacts 76 and 78 of the conducting member 66 are in engagement with the stationary contacts 152 and 154. Consequently, these will be electrically connected to electrically connect conductors fastened to the terminals 156 and 158. When the slide block 132 of the shift mechanism 130 is in either of the two forward speeds or in reverse, the contacts 76 and 78 will be out of engagement with both of the stationary contacts 152 and 154 to open the switch 122.

It will be seen that the embodiment of FIGS. 6–9 provides a switch which is closed in neutral and which is precisely positioned with respect to the shift mechanism 130 so as to be reliably positioned when the shift mechanism is in any one of its predetermined positions. This switch is also protected from the elements and from damage, and again is low in cost and requires little maintenance. It also provides minimum interference with the operation of the transmission.

Referring to the embodiment of FIGS. 10–13, a safety switch 164 is employed with a three-speed transmission 166, being located in a projecting portion 168 of a transmission housing 170. Shift mechanism 172 comprises two shifter forks 174 and 176 located in side-by-side relationship and having semi-circular notches 178 and 180 therein, each of which is large enough to receive a shift rod 182. The shifting arrangement is of a type well known in the art and will not be discussed in detail. The three-speed transmission 166 is commercially available, and is also shown in my design patent No. D–208,213. A more detailed explanation of similar shifter forks can be found in my U. S. Pat. No. 3,563,110 or in Reissue patent Re–26,633. The shifter forks 174 and 176 can be individually moved longitudinally but not together. This is accomplished by a locking plate (not shown) which cooperates with prongs 184 on the shifter forks. Hence, when the shift rod 182 is in either of the notches 178 or 180, the corresponding shifter fork 174, 176 can be longitudinally moved by the rod, if the other fork is in neutral. However, if the rod 182 is partially engaged in both notches, neither fork can be moved. Further, if either of the forks is out of the neutral position of FIG. 11, the other fork cannot be moved.

As viewed in FIG. 11, when the shifter fork 174 is moved to the left from neutral, the transmission is in the third speed forward. When the fork 174 is moved to the right, the transmission is in the second speed forward. When the fork 176 is moved to the left from neutral, the transmission is in the first speed forward; when the fork 176 is moved to the right, the transmission is in reverse. The shift rod 182 is affixed to and depends from a shift ball 186 rotatably supported on a socket 187 in a chamber 188 of the housing 170. A shift lever 190, extends upwardly from the shift ball and terminates in a handle (not shown). The shift mechanism 172 and the shift lever 190 constitute shift means for the transmission 166. A circular cover 192, forming part of the housing 170, also has a central flared portion which aids in rotatably positioning the ball 186. When either of the shifter forks is in any of its three positions, it is aided in being held in the position by any of three recesses or notches 194 which receives a spring-loaded detent ball 196 urged downwardly by a spring 198 in a bore 200.

The switch 164 includes two stationary contacts 202 and 204 having inner surfaces exposed within the housing 170 and outer surfaces exposed outside the housing. Terminals 206 and 208 are electrically connected to the contacts 202 and 204 outside the housing and extend outwardly to receive conductors of a safety circuit. connected to the terminals by suitable clips. The switch 164 also includes a movable switch contact assembly 210. This also can include the conducting strip 66 and the insulating block or member 68. The contact assembly 210 is urged downwardly by a coil spring 212 located between the block 68 and the cover 192. Downward movement of the contact assembly 210 is limited by a stop pin or rod 214 located in a bore or passage 216 above a ball 218. The ball 218 is located centrally between the forks 174 and 176 and rides on top of them, except when small semi-circular notches 220 and 222 of the forks are in alignment, as shown in FIGS. 11 and 13. In that instance, the ball 218 partially drops into the resulting recess formed by the aligned notches 220 and 222, thereby enabling the spring 212 to urge the contact assembly 210 downwardly so that the movable contacts 76 and 78 of the conducting member 66 (FIG. 5) engage the stationary contacts 202 and 204. Wires connected by clips to the terminals 206 and 208 then are electrically connected together, with the switch 164 being closed. Hence, when the shifter forks 174 and 176 are in neutral with the notches 178 and 180 aligned, the notches 220 and 222 are also aligned to enable the switch 164 to close.

The stationary contact 202 and 204 are located in an insulating wall 224 forming a front of a chamber 226 in the projecting portion 168 in which the spring 208 and the contact assembly 210 are located. The insulating wall 224 is held in position by side walls 228 forming sides of the chamber 226 and guiding the contact assembly 214 in a lineal path. The insulating wall 224 also is held in part by the upper cover 192.

From the above it will be seen that the switch 164 has utmost reliability since its position depends directly on the shift mechanism 172 and specifically the forks 174 and 176 which, in turn, are manipulated by the shift lever 190. The switch 164 is also protected from dirt and damage, is low in cost and maintenance requirements, and does not interfere with operation of the transmission.

A further modified safety switch 230 is shown in FIGS. 14-16. The switch 230 differs from the previous embodiments in that it is lineally moved in a path between closed and open positions by a shift lever rather than by shift mechanism which is operated by the lever. Since there is often a certain amount of play between the shift mechanism and the shift lever, thee switch 230 is not quite as precisely located with respect to the shift mechanism and the various shift positions of the transmissions as are the switches of FIGS. 2-4, 6-9, and 12, and 13. Otherwise, however, the safety switch 230 of FIG. 14-16 has the advantages of the previous switches, including being mounted within the overall transmission housing for protection against damage and dirt, being low in cost, requiring little maintenance. Also, as is true of the other switches, there are no protruding parts, except the terminals, to interfere with the operator of operation of the machine with which the transmission is used.

The safety switch 230 is embodied in a three-speed transmission 232, beign located in a projecting portion 234 of a transmission housing 236, which can be similar to the housing 170 without the projecting portion 168. Further, with the three-speed transmission 232, the shifter forks can be identical, with the detents arranged on opposite sides of the cavity for the shift ball. The transmission 232 embodies the same shift rod 182, the shift ball 186, and the shift lever 190. These can function in the same manner as the corresponding elements in the transmission 166.

The safety switch 230 includes stationary contacts 238 and 240 having inner surfaces exposed inside the housing 236 and outer surfaces exposed outside the housing. Terminals 242 and 244 are connected to the stationary contacts and can receive clips for connecting circuit conductors or wires thereto. A movable switch contact assembly 246 in the portion 234 has an insulating member 248 carrying a conducting member 250. The insulating member 248 has an elongate opening 252 therein through which the shift lever 190 extends, with outwardly extending portions 253 and 254 on each side of the opening. The conducting member 250 has a center ring 256 located around the opening 252 with resilient fingers or tangs 258 and 260 extending outwardly therefrom and carrying contacts 262 and 264. These are spaced apart a distance to simultaneously engage both of the stationary contacts 238 and 240 when the shift lever 190 is in a central, neutral position.

The movable contact assembly 248 is located in a chamber 266 of the projecting portion 234, the chamber being formed by an insulating cap 268 and the circular cover 192. A channel 270 is formed in the cap 268 to guide the movable contact assembly 248 in a lineal path toward and away from the stationary contacts 238 and 240, the assembly being supported on a member 272 in the chamber 266.

When the lever 190 is in the central position, the movable contacts 262 and 264 are in engagement with the stationary contacts 238 and 240 and the switch is closed. In this central position, the transmission is in neutral and the lever 190 can be moved back and forth (up and down as viewed in FIG. 15) without changing the position of the movable switch assembly 246. However, when the lever 190 is at either extremity of the neutral position, it can be moved transversely in either direction to place the transmission in first, second, or third speeds in forward or in reverse. This transverse movement causes the contact assembly 248 to move to one side or the other so as to move at least one of the movable contacts 262 and 264 out of engagement with the corresponding stationary contact and thereby open the switch 230.

The overall safety system can be arranged as shown in FIG. 16. As shown, the secondary of the magneto is connected to the spark plug of the engine with the primary connected into a safety circuit in the container 30. The transmission switch 26 is also connected with the magneto primary and the circuit and causes the magneto primary to be shorted when the switch 26 is opened to prevent the engine from starting. A stop switch also can be incorporated with the safety system to stop the engine when desired. Of course, the engine also can be stopped by directly shorting the spark plug in the usual manner.

With this safety system arrangement, if the contacts of the switch 26 are dirty or corroded or for some other reason do not make contact, or if the conductor 2 in series therewith is broken, the engine will still not start, thus providing a fail-safe system.

While two stationary switch contacts and two movable switch contacts are shown in all instances, it is possible, if the circuit used with the engine only requires grounding of a wire, to use a single stationary switch contact and a single movable switch contact. In that instance, for example, the supporting block 68 for the conducting member 66 could be conducting and in continuous contact with the transmission housing, along with the conducting member 66. Consequently, whenever the contact of the movable contact assembly would engage the stationary contact, the wire connected to the terminal of the stationary contact would be grounded through the transmission housing, the stationary contact, of course, being mounted in an insulating wall, as before.

Various modifications of the above described embodiments of the invention will be apparent to thsoe skilled in the art and it is to be understood that such modifications can be made without departing from the scope of the invention, if they are within the spirit and the tenor of the accompanying claims.

I claim:

1. A transmission including shift means having at least one engaged position and a neutral position, said transmission including a housing, at least one stationary electrical contact carried by said housing and having an internal surface exposed to the interior of said housing and an external surface exposed exteriorly of said housing, means associated with the external surface of said stationary contact for connecting a conductor of an electrical circuit thereto, movable contact means located in a chamber of said housing, said movable contact means comprising a conducting strip and an insulating block carrying said strip, said shift means compirisng two adjacent shifter forks lineally movable in parallel paths, a spring in said chamber urging said movable contact means toward said shifter forks, means extending into said chamber into engagement with said movable contact means and movable by said shifter forks to move said movable contact means toward said spring when said shifter forks are in one of the engaged and neutral positions and to enable said spring to move said movable contact means toward said shifter forks when said shifter forks are in the other of the engaged and neutral positions, said movable contact means being in engagement with said stationary contacts when said shift means is in one of the positions.

2. In combination, an internal combustion engine, a transmission connected with said engine, said transmission including shift means having at least one engaged position and a neutral position, said transmission having a switch operated by said shift means, said switch being in a closed position when said shift means is in the neutral position and being in an open position when said shift means is in the engaged position, said switch being connected with said engine and being effective to prevent starting of said engine when said switch is in the open position and to enable said engine to start when said switch is in the closed position, said shift means including a pair of side-by-side shifter forks individually lineally movable in parallel paths, each of said shifter forks having recess means which are in alignment when both of said shifter forks are in the neutral position, said switch comprising movable contact means, means engageable by said shifter forks to move said movable contact means in a path within said housing between the closed position and the open position of said switch, said movable contact means being in the closed position when said recess means are aligned and in the open position when said recess means are out of alignment.

3. In combination, an internal combustion engine, a transmission connected with said engine, said transmission including shift means having at least one engaged position and a neutral position, said transmission having a switch operated by said shift means, said switch being in a closed position when said shift means is in the neutral position and being in an open position when said shift means is in the engaged position, said switch being connected with said engine and being effective to prevent starting of said engine when said switch is in the open position and to enable said engine to start when said switch is in the closed position, said shift means including shifter fork means lineally movable in said housing, said shift means having a recess, said switch comprising movable contact means, means engageable by said shift means to move said movable contact means in a path within said housing between the closed position and the open position of said switch, said engageable means extending into said recess when said shift means is in the neutral position to cause said movable contact means to be in the closed position, and said engageable means being out of the recess when said shift means is in the engaged position to cause said movable contact means to be in the open position.

4. A transmission including shift means having at least one engaged position and a neutral position, said transmission including a housing, at least one stationary electrical contact carried by said housing and having an internal surface exposed to the interior of said housing and an external surface exposed exteriorly of said housing, means associated with the external surface of said stationary contact for connecting a conductor of an electrical circuit thereto, movable contact means within said housing movable in a path toward and away from said stationary contact, said movable contact means comprising a conducting strip and an insulating block carrying said strip, means connecting said movable contact means with said shift means to cause said movable contact means to engage said stationary contact when said shift means is in a predetermined position, said shift means comprising a slide block, means formed by said housing for guiding said slide block in a lineal path, a shift lever engageable with said slide block for moving said slide block between the engaged position and the neutral position, said slide block having a recess in which said insulating block is located, said conducting strip extending out of said recess, said conducting strip engaging said stationary electrical contact when said slide block is in the neutral position.

5. A transmission including shift means having at least one engaged position and a neutral position, said transmission including a housing, at least one stationary electrical contact carried by said housing and having an internal surface exposed to the interior of said housing and an external surface exposed exteriorly of said housing, means associated with the external surface of said stationary contact for connecting a conductor of an electrical circuit thereto, movable contact means within said housing movable in a path toward and away from said stationary contact, said movable contact means comprising a conducting member, means connecting said movable contact means with said shift means to cause said movable contact means to engage said stationary contact when said shift means is in a predetermined position, said shift means comprising a slide block, means formed by said housing for guiding said slide block in a lineal path, a shift lever engageable with said slide block for moving said slide block between the engaged position and the neutral position, said conducting member being carried by said slide block and engaging said stationary electrical contact when said slide block is in one of the engaged and neutral positions.

6. A transmission including shift means having at least one engaged position and a neutral position, said transmission including a housing, at least one stationary electrical contact carried by said housing and having an internal surface exposed to the interior of said housing and an external surface exposed exteriorly of said housing, means associated with the external surface of said stationary contact for connecting a conductor of an electrical circuit thereto, movable contact means within said housing movable in a path toward and away from said stationary contact, said movable contact means comprising a conducting strip and an insulating block carrying said strip, means connecting said movable contact means with said shift means to cause said movable contact means to engage said stationary contact when said shift means is in a predetermined position, said insulating block having an elongate opening, said shift means comprising shift mechanism and a shift lever, said lever extending through said elongate opening, said contact means being in one position when said shift means is in the neutral position and being in either of two other positions when said shift means in in an engaged position.

* * * * *